United States Patent
Honna et al.

(10) Patent No.: US 6,682,650 B2
(45) Date of Patent: Jan. 27, 2004

(54) ZEOLITE CATALYST CARRIER AND HYDROGENATION CATALYST USING SAME

(75) Inventors: Kosaku Honna, Ichikawa (JP); Yasuhiro Araki, Saitama (JP); Yasuo Miki, Tsuchiura (JP); Hiromichi Shimada, Tsukuba (JP)

(73) Assignees: Japan Cooperation Center, Petroleum (JP); National Institute of Advanced Industrial Science and Technology (JP)

( * ) Notice: Subject to any disclaimer, the term of this patent is extended or adjusted under 35 U.S.C. 154(b) by 386 days.

(21) Appl. No.: 09/873,241

(22) Filed: Jun. 5, 2001

(65) Prior Publication Data

US 2003/0075479 A1 Apr. 24, 2003

(51) Int. Cl.⁷ ................................................ B01J 29/06
(52) U.S. Cl. ............................ 208/111.1; 208/111.01; 208/111.3; 208/111.35; 502/64; 502/66; 502/79; 502/85; 502/87

(58) Field of Search ............................. 502/64, 66, 74, 502/79, 85, 87; 208/111.1, 111.01, 111.3, 111.35

(56) References Cited

U.S. PATENT DOCUMENTS 3,890,247 A  *  6/1975  Young ........................... 502/66
4,830,998 A  *  5/1989  Szabo et al. ................... 502/66

* cited by examiner

*Primary Examiner*—M. Alexandra Elve
*Assistant Examiner*—Christina Ildebrando
(74) *Attorney, Agent, or Firm*—Lorusso, Loud & Kelly

(57) ABSTRACT

A catalyst support including a zeolite having an Al/Si atomic ratio of 0.01–0.1 and mesopores having a pore diameter in the range of 5–30 nm, and ultrafine particles composited to inside walls of the mesopores. The superfine particles are those of an oxide of a metal selected from Ti, Zr and Hf. A catalyt having a hydrogenation catalytic metal loaded on the above catalyst support exhibits

9 Claims, 4 Drawing Sheets

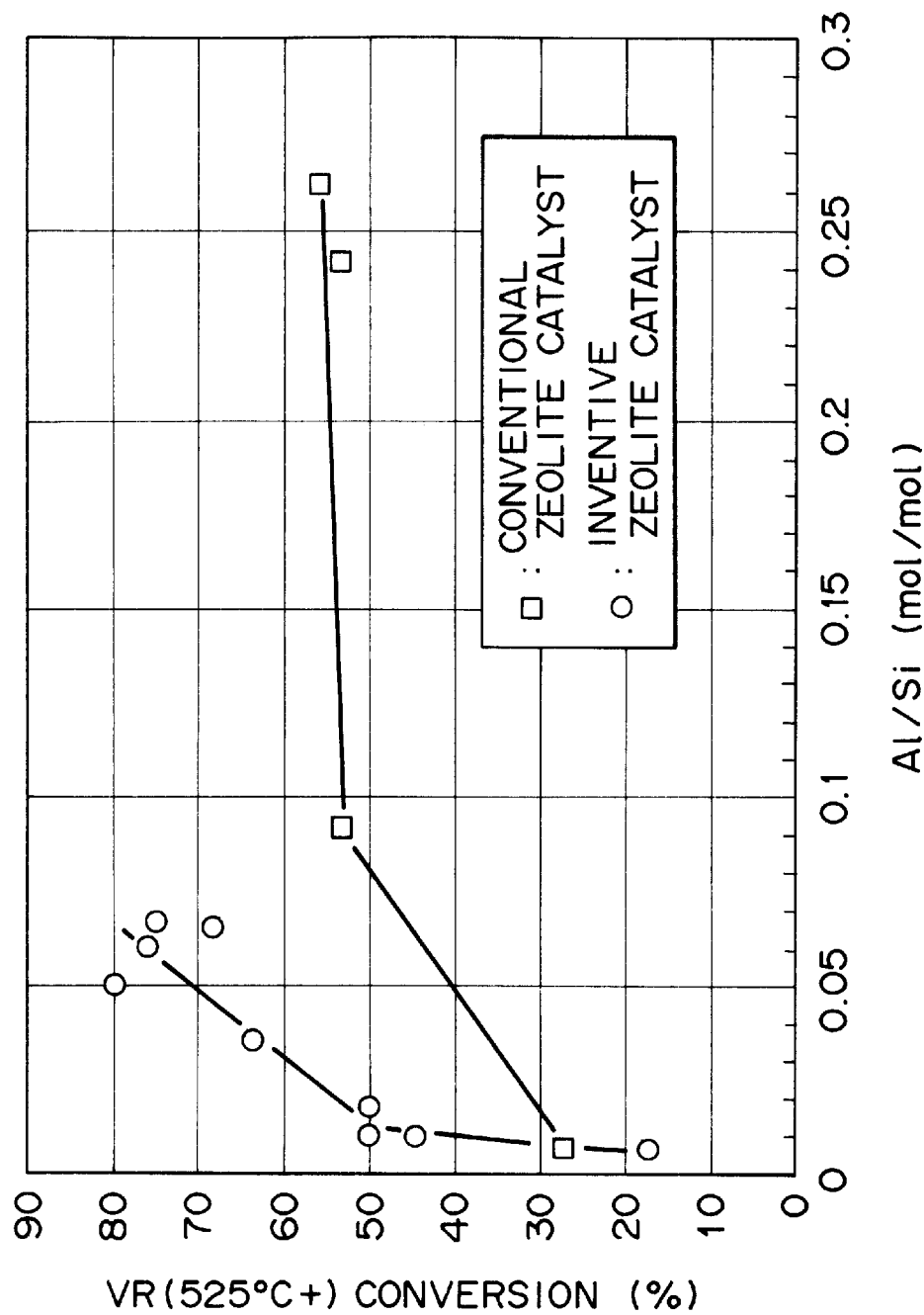
F I G. 1

ZEOLITE CATALYST CARRIER AND HYDROGENATION CATALYST USING SAME

BACKGROUND OF THE INVENTION

This invention relates to a zeolite carrier, to a method of preparing same, to a hydrogenation catalyst using same and to a process for hydrocracking a heavy oil using such a catalyst.

One known catalyst for hydrocracking heavy oils uses a solid acid carrier, such as silica-alumina or alumina-boria, for supporting a hydrogenation catalytic metal. The known catalyst has problems because a high reaction temperature of at least 420° C. and a high hydrogen partial pressure are required to perform hydrocracking. Further, the catalytic metal must be used in a large amount to obtain satisfactory hydrocracking efficiency. To cope with this problem, a catalyst having a catalytic metal supported on a zeolite carrier and exhibiting high hydrogenation activity has been proposed. This catalyst, however, poses a problem of catalyst poisoning when used for the hydrocracking of an asphaltene-containing heavy oil and is ill-suited for industrial scale application.

SUMMARY OF THE INVENTION

It is an object of the present invention to provide a composite zeolite material which can uniformly support catalytically active metal components for various reactions and which can efficiently exhibit its acid function.

Another object of the present invention is to provide a catalyst which can exhibit hydrogenation activities such as hydrocracking, hydrodesulfurization and hydrodenitrification activities.

It is a further object of the present invention to provide a catalyst of the above-mentioned type suitable for hydrocracking an asphaltene-containing heavy oils.

In accomplishing the above problems, the present invention provides a catalyst support comprising a zeolite having an Al/Si atomic ratio of 0.01–0.1 and mesopores having a pore diameter in the range of 5–30 nm, and ultrafine particles composited to inside walls of the mesopores, said superfine particles being an oxide of a metal selected from the group consisting of Ti, Zr and Hf.

In another aspect, the present invention provides a catalyst having a catalytic metal having hydrogenation activity and supported on the above catalyst support.

The present invention further provides a method of preparing the above catalyst support, which includes the steps of:
  (a) contacting a zeolite with a solution having a pH of 0.8–2 and containing a salt of a metal selected from the group consisting of Ti, Zr and Hf, said zeolite having an Al/Si atomic ratio of 0.01–0.35 and mesopores having a pore diameter in the range of 5–30 nm and accounting for at least 10% by volume of a total pore volume thereof, so that a hydroxide of said metal deposits on inside walls of the mesopores with the simultaneous reduction of the Al/Si atomic ratio;
  (b) then washing and drying said metal hydroxide-bearing zeolite; and
  (c) then calcining said dried zeolite at 400–600° C. to convert the metal hydroxide into metal oxide.

The present invention also provides a process for hydrocracking a heavy oil comprising subjecting the heavy oil to hydrocracking conditions in the presence of the above catalyst.

BRIEF DESCRIPTION OF THE DRAWINGS

Other objects, features and advantages of the present invention will become apparent from the detailed description of the preferred embodiments which follows, when considered in light of the accompanying drawings, in which:

FIG. 1 is a graph showing a relationship between the acid site density (Al/Si atomic ratio) of a catalyst and the conversion of vacuum residues;

DETAILED DESCRIPTION OF THE PREFERRED EMBODIMENTS OF THE INVENTION

Figure 2:
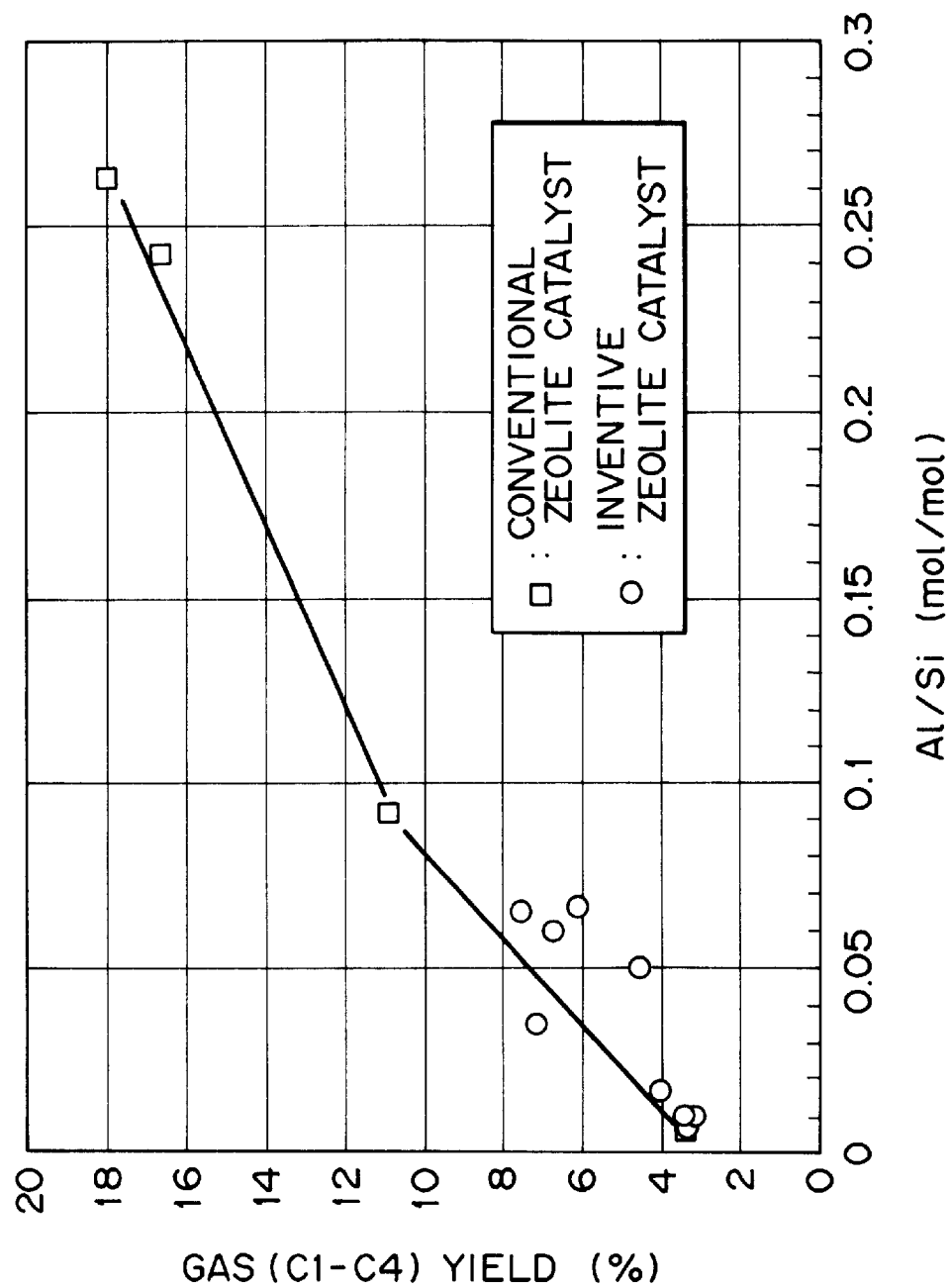
FIG. 2 is a graph showing a relationship between the acid site density of a catalyst and the yield of C1–C4 hydrocarbon gas.

The catalyst support according to the present invention comprises a zeolite having an Al/Si atomic ratio of 0.01–0.1, preferably 0.03–0.08, and having ultrafine particles of an oxide of a metal selected from the group consisting of Ti, Zr and Hf which particles are composited to inside walls of mesopores of the zeolite.

The ultrafine particles generally have a particle diameter of 5–10 nm and are preferably as uniform as possible in size. The amount of the ultrafine particles is generally 1–10%, preferably 3–7%, based on the weight of the catalyst support. The ultrafine particles preferably are titania particles or zirconia particles.

The catalyst support may be prepared by treating a zeolite with a solution having a pH of 0.8–2 and containing a salt of a metal selected from the group consisting of Ti, Zr and Hf. The treated zeolite is then washed, dried and calcined at 400–600° C.

The zeolite used as the starting material has an Al/Si atomic ratio of 0.01–0.35, preferably 0.1–0.33 and mesopores (pores having a pore diameter of 5–30 nm) accounting for at least 10% by volume, preferably at least 15% by volume of a total pore volume thereof. The upper limit of the amount of the mesopores is generally about 30% by volume of the total pore volume of the zeolite. The average particle diameter of the primary particles of the zeolite is not specifically limited but is generally in the range of 0.1–1 $\mu$m, preferably 0.2–0.5 $\mu$m. The preferred pore characteristics of the zeolite are as follows:

total pore volume: 0.3–0.5 cc/g
  BET surface area: 400–800 m/g
  pore volume of pores having 5–30 nm: 0.1–0.2 cc/g.

Ultrastable Y-zeolite is suitably used as the starting material zeolite. The starting material zeolite is used in the form of a proton-exchanged state.

Any water-soluble salt, such as sulfate or halide, of a metal selected from Ti, Zr and Hf may be used for the formation of an aqueous solution thereof. The concentration of such a metal salt in the aqueous solution is generally 0.02–0.1 mol/L, preferably 0.50–0.1 mol/L. It is important that the aqueous solution have a pH of 0.8–2, preferably 1.0–1.9. The contact of the zeolite with the aqueous metal salt solution is generally performed at a temperature of 25–80° C.

As a result of the contact of the zeolite with the aqueous metal salt solution, dealumination proceeds by reaction of the aluminum with the strong acid. At the same time, ultrafine particles of hydroxide of the metal deposit on inside walls of the mesopores. The contact of the zeolite with the aqueous metal salt solution is continued until the zeolite has a desired reduced value of the Al/Si atomic ratio. Thus, by controlling the contacting conditions, such as time, pH and temperature, it is possible to obtain a desired Al/Si ratio, generally in the range of 0.005–0.1.

The zeolite after the above dealumination treatment is then washed with water until no acid is detected in the washed water. Thereafter, the washed zeolite is dried preferably at a temperature of 25–100° C., more preferably at 40–55° C. The use of a low drying temperature is desirable for preventing aggregation of the ultrafine metal hydroxide particles.

The dried zeolite is then calcined at 400–600° C., preferably 450–550° C., to convert the metal hydroxide to the corresponding metal oxide, thereby obtaining a catalyst carrier according to the present invention. The calcination may be carried out in any desired atmosphere such as in air or nitrogen generally for 2–4 hours.

The Al/Si atomic ratio of the carrier may be suitably adjusted according to the intended use thereof. In the case of hydrotreatment catalyst, such as catalyst for hydrocracking heavy oils, the Al/Si ratio is preferably 0.01–0.1. An Al/Si ratio in excess of 0.1 causes reduction of asphaltene decomposition activity of the resulting catalyst and an increase of gas components in the hydrocracking product. Too small an Al/Si ratio below 0.01, on the other hand causes considerable reduction of high boiling oil (boiling point of 520° C. or higher) decomposition activity of the resulting catalyst.

The hydrotreatment catalyst according to the present invention comprises the above catalyst carrier and a catalytic metal having hydrogenation activity and supported thereon. Any catalytic metal conventionally used for hydrotreatment may be used for the purpose of the present invention. Illustrative of suitable catalytic metals are molybdenum, tungsten, nickel, cobalt, Group VIII metals such as platinum and palladium, and mixtures thereof. Use of a mixed metal system such as Ni—Mo, Co—Mo or Ni—W is preferred for reasons of improved hydrogenation activity. The catalytic metal may be present in the form of an elemental metal, an oxide and/or a sulfide. The catalytic metal may be supported on the carrier by any suitably known manner such as by impregnation.

The amount of the catalytic metal is 0.1–10%, preferably 1–8%, in terms of elemental metal, based on the weight of the catalyst carrier. It is also preferred that the catalytic metal be present in an amount of at least 20%, preferably 25–50%, based on the weight of the metal oxide (e.g. titania or zirconia) of the catalyst carrier. The hydrotreatment catalyst preferably has an average pore diameter of 5–30 nm, more preferably 20–25 nm, as measured by nitrogen adsorption method (BJH method; measured pore diameter range: 17–3000 Å)

The hydrotreatment catalyst according to the present invention may be suitably used for various hydrotreatment such as hydrogenation, hydrodemetallization, hydrodesulfurization, hydrodenitrification, hydrodearomatization and hydrocracking and, in particular, for hydrocracking asphaltene-containing heavy oils. In hydrocracking, a heavy oil is treated at a temperature of 350–440° C., preferably 390–420° C., and a pressure of 80–250 atm, preferably 100–200 atm, in the presence of the hydrotreatment catalyst. The heavy oils may include petroleum crude, reduced crude, vacuum residue and vacuum gas oil. With the hydrotreatment catalyst according to the present invention, the high boiling point components can be efficiently converted into light hydrocarbon oils and, at the same time, a high asphaltene-decomposition efficiency can be attained.

The following examples will further illustrate the present invention.

EXAMPLES 1-1 TO 1-11

Preparation of Catalyst Carrier:

Using four kinds of acid-resistant, proton-type zeolite Y having the composition and amount of acid shown in Table 1 below as starting materials, eleven kinds of modified zeolites were prepared.

TABLE 1

| Starting Material Zeolite | Composition (atomic ratio and molar ratio) | Amount of Solid Acid ($NH_3$-TPD: mmol/g) |
| --- | --- | --- |
| HUSY1 | Al/Si = 0.317 ($SiO_2/Al_2O_3$ = 6.3) | 1.33 mmol/g |
| HUSY2 | Al/Si = 0.276 ($SiO_2/Al_2O_3$ = 7.2) | 1.22 mmol/g |
| HUSY3 | Al/Si = 0.116 ($SiO_2/Al_2O_3$ = 17) | 0.50 mmol/g |
| HUSY4 | Al/Si = 0.008 ($SiO_2/Al_2O_3$ = 262) | 0.005 mmol/g |

Into a 1 L glass flask, 350 ml of an aqueous solution of titanium (IV) sulfate (0.05 mol/L) having a pH of 1.0 was placed and warmed to 50° C. To this solution, 27 g of HUSY1 shown in Table 1 were added and the mixture was reacted at that temperature with stirring for 30 minutes to obtain a slurry having a pH of 1.7. The reaction mixture was filtered under vacuum. The solids separated were washed with 1 L of warm water at 50° C. and then with ion-exchanged water until no sulfate ion was detected in the wash water by an aqueous Ba solution. The thus obtained zeolite in the form of a cake was dried in an air stream at room temperature and then at 110° C. for 3 hours. The dried powder thus obtained was calcined at 500° C. for 3 hours in a nitrogen stream (100 ml/min) to obtain modified zeolite TZ19 (Example 1.1).

Zeolite TZ19 was measured for its composition by IPC analysis, relative crystallization degree by X-ray diffraction analysis, amount of acid by $NH_3$-TPD method, pore distribution and specific surface area by $N_2$ adsorption method, and particle size of ultrafine particles in mesopores by transmission electron microscope (TEM). The results are summarized in Tables 2 to 4.

The above procedures were repeated in a manner similar to that described above using the four starting material zeolites shown in Table 1 while varying zeolite treatment conditions involving treatment temperatures in the range of 50–80° C., treatment times in the range of 4–10 hours, and Ti(IV) concentrations in the range of 0.05–0.2 mol/L (Examples 1.2 through 1.11). The results are as summarized in Tables 2 to 4.

TABLE 2

| Example No. | Modified Zeolite | Starting Zeolite | Composition (wt %) | | | Al/Si Atomic Ratio |
| --- | --- | --- | --- | --- | --- | --- |
| | | | Si | Al | Ti | |
| 1.1 | TX19 | HUSY1 | 40.5 | 0.25 | 7.56 | 0.006 |
| 1.2 | TX18 | HUSY1 | 43.9 | 0.47 | 4.10 | 0.011 |
| 1.3 | TX17 | HUSY1 | 43.1 | 0.46 | 4.60 | 0.011 |
| 1.4 | TX16 | HUSY1 | 43.2 | 0.75 | 4.50 | 0.018 |

TABLE 2-continued

| Example No. | Modified Zeolite | Starting Zeolite | Composition (wt %) | | | Al/Si Atomic Ratio |
|---|---|---|---|---|---|---|
| | | | Si | Al | Ti | |
| 1.5 | TX22 | HUSY1 | 43.6 | 1.10 | 4.70 | 0.026 |
| 1.6 | TX24 | HUSY1 | 40.8 | 2.54 | 5.50 | 0.065 |
| 1.7 | TX25 | HUSY1 | 42.5 | 3.27 | 3.70 | 0.081 |
| 1.8 | TX23 | HUSY1 | 42.1 | 3.74 | 3.50 | 0.092 |
| 1.9 | TX29-1 | HUSY2 | 42.3 | 3.22 | 4.31 | 0.079 |
| 1.10 | TX29-2 | HUSY3 | 45.5 | 1.61 | 2.78 | 0.037 |
| 1.11 | TX20 | HUSY4 | 48.1 | 0.32 | 0.66 | 0.007 |

TABLE 3

| Example No. | Specific Surface Area (m²/g) | | | BJH (1)-PV (cc/g) |
|---|---|---|---|---|
| | BET | BJH (1) | BJH (2) | |
| 1.1 | 653 | 94 | 31 | 0.168 |
| 1.2 | — | 133 | — | 0.200 |
| 1.3 | — | 120 | — | 0.178 |
| 1.4 | — | 139 | — | 0.207 |
| 1.5 | 803 | 106 | 28 | 0.170 |
| 1.6 | 833 | 114 | 35 | 0.186 |
| 1.7 | 814 | 105 | 32 | 0.191 |
| 1.8 | 807 | 108 | 29 | 0.196 |
| 1.9 | 804 | 105 | 34 | 0.187 |
| 1.10 | 836 | 111 | 29 | 0.190 |
| 1.11 | — | — | — | — |

TABLE 4

| Example No. | TiO₂ Particle Diameter (Å) | Degree of Crystallinity (%) | NH₃-TPD Relative Value |
|---|---|---|---|
| 1.1 | 150–300 | 16 | 0.21 |
| 1.2 | — | 26 | 0.26 |
| 1.3 | — | 26 | 0.26 |
| 1.4 | — | 34 | 0.38 |
| 1.5 | — | 43 | 0.32 |
| 1.6 | 60–100 | 65 | 0.56 |
| 1.7 | 60–100 | 79 | 0.58 |
| 1.8 | 60–100 | 77 | 0.54 |
| 1.9 | 50–80 | 75 | 0.69 |
| 1.10 | 50–80 | 83 | 0.35 |
| 1.11 | — | 95 | 0.01 |

In Tables 3 and 4, the symbols BJH(1), BJH(2), BJH (1)-PV, Degree of Crystallinity and NH₃-TPD Relative Value have the following meanings:
BJH(1): specific surface area of pores having a pore diameter in the range of 17–3000 Å
BJH(2): specific surface area of pores having a pore diameter in the range of 50–3000 Å
BJH(1)-PV: pore volume of pores having a pore diameter in the range of 17–3000 Å
Degree of Crystallinity: value relative to the degree of crystallinity (=100%) of sodium type zeolite Y (NaY)
NH₃-TPD Relative Value: value relative to the amount of acid of HUSY1 (=1.0)

EXAMPLES 2.1 TO 2.10 AND COMPARATIVE EXAMPLES 2.1 TO 2.4

To the catalyst carrier (modified and non-modified zeolites) shown in Table 2 and starting zeolites shown in Table 1, Mo as a catalytic metal having hydrogenation activity was supported by equilibrium adsorption to obtain catalysts (Examples 2.1 to 2.10 and Comparative Examples 2.1 to 2.4) having compositions and properties as shown in Tables 5–7 below. The preparation method was as follows.

An aqueous solution (pH: 2.0) containing 0.007 mo/L of ammonium heptamolybdenate (AHM:$(NH_4)_6Mo_7O_{24} \cdot 4H_2O$) was prepared. Into a closed vessel, 140 ml of the aqueous AHM solution and 3.5 g of zeolite were charged and the mixture was shaken at 50° C. for 24 hours. After the equilibrium adsorption, the contents in the vessel were filtered under vacuum. The zeolite cake thus obtained was air-dried at room temperature and then dried at 110° C. for 3 hours. The dried zeolite was calcined at 500° C. for 3 hours in nitrogen atmosphere to obtain Mo-loaded zeolite catalyst.

TABLE 5

| Example No. | Catalyst | Catalyst Carrier | Composition (wt %) | | | Al/Si Atomic Ratio |
|---|---|---|---|---|---|---|
| | | | Si | Al | Ti | |
| 2.1 | TM-6 | TZ-20 | 48.1 | 0.32 | 0.66 | 0.007 |
| 2.2 | TM-5 | TZ-19 | 40.5 | 0.25 | 7.56 | 0.006 |
| 2.3 | TM-4 | TZ-18 | 43.5 | 0.43 | 3.48 | 0.010 |
| 2.4 | TM-3 | TZ-17 | 42.2 | 0.42 | 3.95 | 0.010 |
| 2.5 | TM-2 | TZ-16 | 42.6 | 0.70 | 3.83 | 0.017 |
| 2.6 | TM-10 | TZ-22 | 41.1 | 1.00 | 3.86 | 0.025 |
| 2.7 | TM-12 | TZ-24 | 40.7 | 1.96 | 4.93 | 0.050 |
| 2.8 | TM-13 | TZ-25 | 40.8 | 2.35 | 3.06 | 0.060 |
| 2.9 | TM-19 | TZ-29-1 | 42.0 | 2.62 | 4.13 | 0.065 |
| 2.10 | TM-20 | TZ-29-2 | 45.0 | 1.52 | 2.34 | 0.035 |
| Comp. 2.1 | TM-1 | HUSY-1 | 36.4 | 8.45 | 0.02 | 0.242 |
| Comp. 2.2 | TM-7 | HUSY-4 | 48.8 | 0.32 | 0.01 | 0.007 |
| Comp. 2.3 | TM-17 | HUSY-2 | 36.2 | 9.10 | 0.02 | 0.262 |
| Comp. 2.4 | TM-18 | HUSY-3 | 43.9 | 3.85 | 0.03 | 0.091 |

TABLE 6

| Example No. | Specific Surface Area (m²/g) | | BJHi (1)-PV (cc/g) | Degree of Crystallinity (%) |
|---|---|---|---|---|
| | BET | BJH (1) | | |
| 2.1 | 679 | 127 | 0.284 | 81 |
| 2.2 | 568 | 114 | 0.187 | 3 |
| 2.3 | 668 | 133 | 0.200 | 8 |
| 2.4 | 652 | 120 | 0.178 | 7 |
| 2.5 | 724 | 139 | 0.207 | 15 |
| 2.6 | 804 | 135 | 0.214 | — |
| 2.7 | 811 | 146 | 0.226 | 59 |
| 2.8 | 818 | 135 | 0.198 | 68 |
| 2.9 | 810 | 131 | 0.262 | 73 |
| 2.10 | 893 | 119 | 0.209 | 79 |
| Comp. 2.1 | 627 | 74 | 0.154 | 79 |
| Comp. 2.2 | — | — | — | 84 |
| Comp. 2.3 | 642 | 91 | 0.162 | 77 |
| Comp. 2.4 | 852 | 126 | 0.087 | 97 |

TABLE 7

| Example No. | NO Adsorption NO/Mo | TiO₂ Particle Diameter (Å) | NH₃-TPD Relative Value |
|---|---|---|---|
| 2.1 | — | — | 0.01 |
| 2.2 | 0.14 | 150–300 | 0.21 |
| 2.3 | — | — | 0.26 |
| 2.4 | — | — | 0.26 |
| 2.5 | — | — | 0.38 |
| 2.6 | — | — | 0.32 |
| 2.7 | 0.09 | 60–100 | 0.56 |
| 2.8 | 0.12 | 60–100 | 0.58 |
| 2.9 | 0.11 | 50–80 | 0.69 |

TABLE 7-continued

| Example No. | NO Adsorption NO/Mo | TiO$_2$ Particle Diameter (Å) | NH$_3$-TPD Relative Value |
|---|---|---|---|
| 2.10 | 0.10 | 50–80 | 0.35 |
| Comp. 2.1 | 0.13 | — | 1.00 |
| Comp. 2.2 | — | — | 0.01 |
| Comp. 2.3 | 0.08 | — | 0.83 |
| Comp. 2.4 | — | — | 0.91 |

EXAMPLES 3.1 TO 3.8 AND COMPARATIVE EXAMPLES 3.1 TO 3.4

Each of the Mo-loaded zeolite catalysts obtained in Examples 2.3 through 2.10 and Comparative Examples 2.1 through 2.4 was tested for its catalytic activity for hydrocracking a heavy oil as follows. In an autoclave having an inside volume of 140 ml, 10 g of Arabian heavy atmospheric residue and 1 g of a catalyst as shown in Table 8 were charged, to which hydrogen was fed to provide an initial pressure of 9.8 Mpa. The reaction was then carried out at 410° C. for 6 hours. After the reaction, the gas product was analyzed by TCD gas chromatography (Hewlett Packard/AC Inc.). The reaction mixture was diluted with carbon disulfide and separated into a solid phase (catalyst) and a liquid phase. The liquid phase was subjected to high temperature distillation gas chromatography (Hewlett Packard/AC Inc.) to analyze the composition thereof in terms of distillation characteristics up to 750° C. fraction, from which conversion of vacuum residues (525° C.+) was calculated.

The remaining asphaltene was analyzed as heptane-insolubles. The results are summarized in Table 8 and in FIGS. 1–4.

TABLE 8

| Example No. | Catalyst | VR (525° C. +) Conversion (%) | Gas (C1–C4) Yield (%) | Asphaltene Conversion (%) | Hydrogen Consumption (wt %) |
|---|---|---|---|---|---|
| 3.1 | TM-4 | 50.0 | 3.4 | 66.8 | 2.58 |
| 3.2 | TM-3 | 44.0 | 3.1 | 62.8 | 2.48 |
| 3.3 | TM-2 | 49.9 | 4.0 | 57.6 | 2.49 |
| 3.4 | TM-10 | 58.9 | 3.4 | 72.5 | 3.36 |
| 3.5 | TM-12 | 79.5 | 4.5 | 63.3 | 5.04 |
| 3.6 | TM-13 | 75.7 | 6.7 | 34.0 | 4.89 |
| 3.7 | TM-19 | 68.4 | 7.5 | 6.1 | 5.36 |
| 3.8 | TM-20 | 63.5 | 7.1 | 48.6 | 4.21 |
| Comp. 3.1 | TM-1 | 53.4 | 16.6 | −21.0 | 5.58 |
| Comp. 3.2 | TM-7 | 27.1 | 3.4 | 53.3 | 2.75 |
| Comp. 3.3 | TM-17 | 55.9 | 18.0 | −48.8 | 5.13 |
| Comp. 3.4 | TM-18 | 53.1 | 10.9 | 19.7 | 5.10 |

FIGS. 1 and 2 are graphs showing a relationship between the acid site density (Al/Si atomic ratio) of a catalyst and the conversion of vacuum residues (525° C.+) and between the acid site density and the yield of C1–C4 hydrocarbon gas, respectively. In FIGS. 1 and 2, the plots of while circles and while squares represent the catalyst of the present invention and the conventional catalyst, respectively. As will be appreciated from FIG. 2, the catalysts of the present invention show similar solid acid dependency of the gas yield to that of the conventional catalysts and the gas yield is lower than that of the conventional catalysts.

Figure 3:
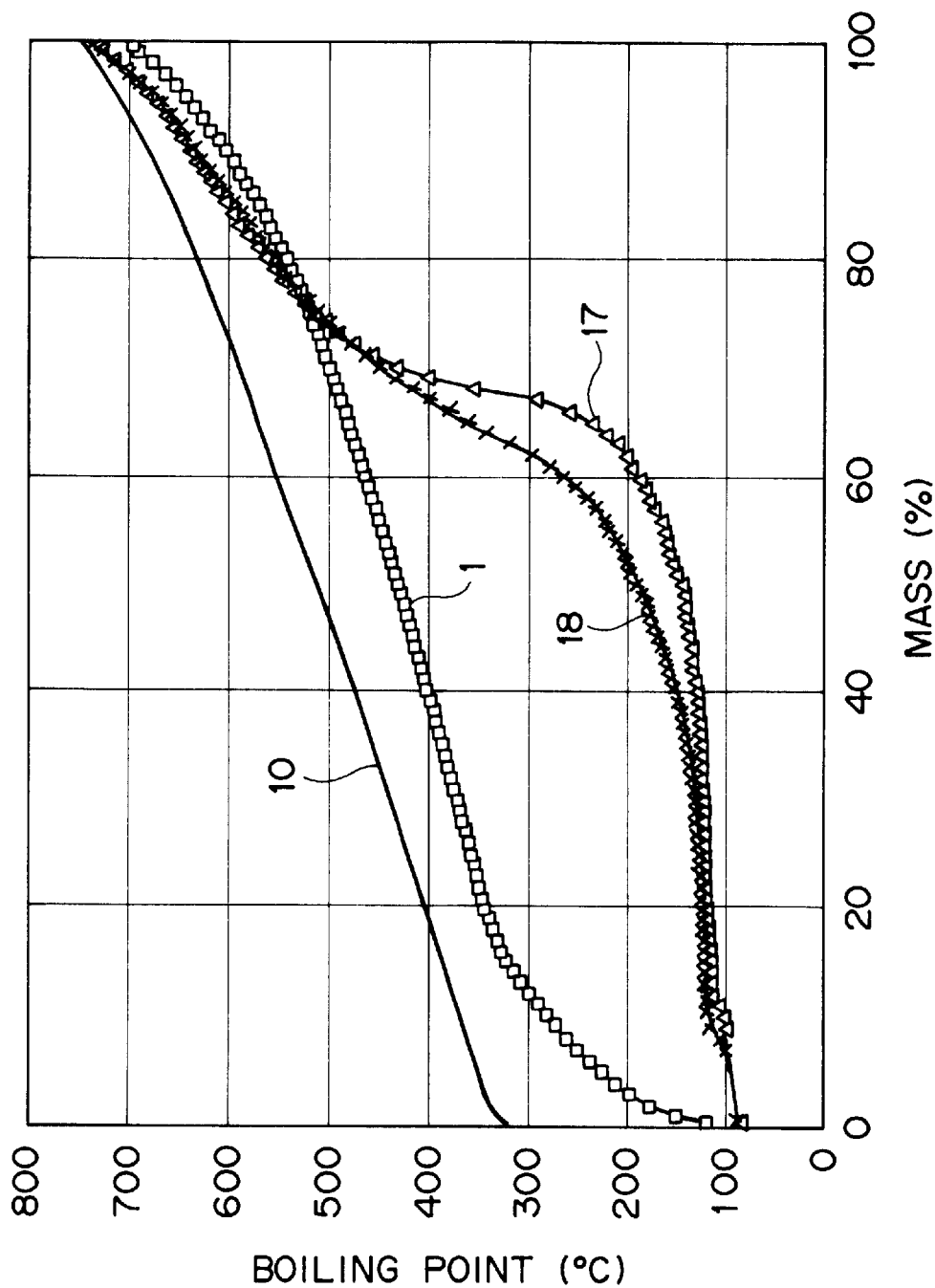
FIG. 3 shows distillation curves of the liquid products obtained with conventional catalysts and the feed oil.
Figure 4:
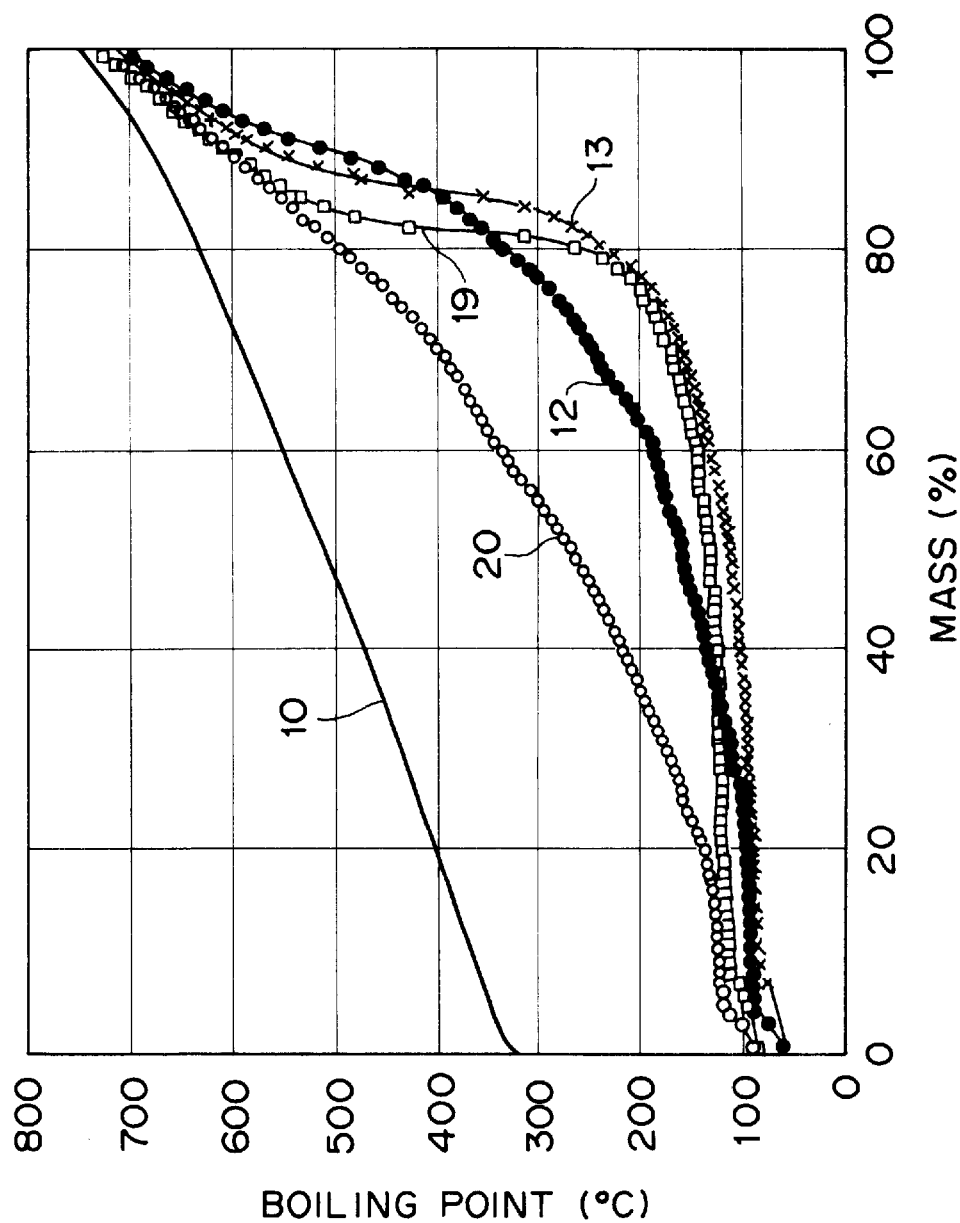
FIG. 4 shows distillation curves, similar to FIG. 3, of the liquid products obtained with catalyst of the present invention.

The results shown in FIG. 1 indicate that the decomposition of vacuum residues having large molecular sizes is not facilitated even with an increase in acid sites (increase in Al/Si ratio). Further, it will be appreciated from FIG. 3 that only non-catalyzed cracking proceeds for the high boiling point fractions. In the case of the catalyst of the present invention, on the other hand, catalytic hydrocracking of high boiling point fractions resulting from the solid acid effectively occurs as shown in FIGS. 1 and 4. In FIG. 3, the curve 10 shows a distillation curve of the feed of Arabian heavy atmospheric residue, and curves 1, 17 and 18 are of the hydrotreated oils obtained using the conventional catalysts TM-1 (Comparative Example 3.1), TM-17 (Comparative Example 3.3) and TM-18 (Comparative Example 3.4), respectively. In FIG. 4, the curve 10 shows a distillation curve of the feed of Arabian heavy atmospheric residue, and curves 12, 13, 19 and 20 are of the hydrotreated oils obtained using the catalyst TM-12 (Example 3.5), TM-13 (Example 3.6), TM-19 (Example 3.7), and TM-20 (Example 3.8), respectively.

EXAMPLE 4 AND COMPARATIVE EXAMPLE 4

Heat resistance of the above catalyst TM-12 according to the present invention and the conventional catalyst TM-1 was evaluated as follows. A packed layer of the catalyst was heated to 400° C. or 900° C. and maintained at that temperature for 1 hour while H$_2$ gas containing 5% of H$_2$S was passed at a flow rate of 15 ml/min (standard state) through the catalyst layer. The catalyst layer was then cooled to 25° C. in helium gas stream (flow rate: 20 cc/min). Then, helium gas containing 10.2% of NO was allowed to pass through the catalyst layer in a 2 ml pulse. The amount of NO adsorbed was measured. The results are summarized in Table 9.

TABLE 9

| | | NO/Mo mole ratio | |
|---|---|---|---|
| Example | Catalyst | Sulfide treatment at 900° C. | Sulfide treatment at 400° C. |
| Example 4 | TM-12 | 0.092 | 0.094 |
| Comparative Ex. 4 | TM-1 | 0.004 | 0.129 |

In the case of the catalyst TM-12 according to the present invention, NO/Mo ratio, which provides an index for dispersion of the catalytic metal, does not change by the treatment of H$_2$S at 400° C. and at 900° C., suggesting that agglomeration of catalytic metal (Mo) does not occur under sulfurizing conditions. In contrast, NO/Mo mole ratio considerably decreased in the case of the conventional catalyst TM-1, suggesting that Mo is susceptible to form agglomerate under sulfurizing conditions.

EXAMPLE 5 AND COMPARATIVE EXAMPLE 5

For the purpose of evaluating catalytic activity for hydrotreatment, a model reaction (hydrocracking of tetralin) was carried out using the above catalyst TM-12 according to the present invention and the conventional catalyst TM-1 as follows.

In a stainless steel autoclave having an inside volume of 35 ml, 5 ml of tetralin was charged together with a quantity of the catalyst, to which hydrogen was fed to provide an initial pressure of 6 Mpa. The reaction was then carried out at 390° C. for a given period of time. After the reaction, the product was quantitatively analyzed by FID gas chromatography to determine the amount of tetralin, cracking product and polycondensation product, etc. From a series to tests, the catalytic activity was evaluated. The results are summarized in Table 10.

TABLE 10

| | | (Concentration of catalyst required for obtaining 50% conversion) × time | |
|---|---|---|---|
| Example | Catalyst | (catalyst/tetralin) × hr | (Mo/tetralin) × hr |
| Example 4 | TM-12 | 0.02 | $1.62 \times 10^{-4}$ |
| Comparative Ex. 4 | TM-1 | 0.04 | $1.34 \times 10^{-3}$ |

From the results shown in Table 10, it will be appreciated that the catalyst of the present invention is about 2–8 times as active as the conventional catalyst.

EXAMPLE 6

The catalyst of the present invention was measured by electron microscope with magnification of $5 \times 10^5$. Ultrafine particles having a diameter of 5–10 nm were found to be composited on the outer surface of zeolite and inside walls of mesopores thereof. Another electron microphotograph (magnification: $10^6$) revealed ultrafine particles (confirmed by lattice pattern of the 101 plane (d=0.35 nm) of anatase) and ultrafine crystals of $MoS_2$ (002 plane (D=0.62 nm)) composited to the ultrafine particles.

In the conventional zeolite catalysts, a catalytic metal composited thereto fails to effectively exhibit its activity. Therefore, polycondensation products are apt to form, thereby hindering effective catalytic sites. The catalyst of the present invention has solved the following defects of the conventional catalysts; (a) hydrogenation activity for high boiling point fractions is low, (b) hydrogenation activity for asphaltene is low, and (c) catalytic deactivation easily occurs; and exhibits excellent hydrogenation activity. The feature of the carrier according to the present invention resides in that a catalytic metal can be composited thereto in a density, while maintaining catalytic characteristics of solid acid, to provide highly functional solid acid catalyst. In particular, the inventive catalyst carrier is characterized in that ultrafine oxide particles, which exhibit resistance to reduction and which provide sites to which a catalytic metal can be composited, are formed on inside surfaces of mesopores that are effective for the hydrogenation of heavy oils. The catalytic metal which is composited to the catalyst carrier is present in a highly dispersed state on the ultrafine oxide particles, ensuring high catalytic activity and resistance to aggregation of the catalytic metal. The catalyst of the present invention is particularly suitably utilized as hydrocracking catalyst for asphaltene-containing heavy oils. The catalyst is also used hydrotreating catalyst (hydrodesulfurization, hydrodenitrification and hydrodearomatization) because of its high activity at low temperature and long catalyst life. Further, the catalyst of the present invention may be used for wide variety of reactions other than petroleum refining, because of its easiness in controlling solid acid function and in imparting higly functional hydrogenation activity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A catalyst support comprising a zeolite having an Al/Si atomic ratio of 0.01–0.1 and mesopores having a pore diameter in the range of 5–30 nm, and ultrafine particles composited to inside walls of the mesopores, said superfine particles being an oxide of a metal selected from the group consisting of Ti, Zr and Hf.

2. A catalyst support as claimed in claim 1, wherein said ultrafine particles are present in an amount of 1–10% by weight based on the weight of the catalyst support.

3. A catalyst support as claimed in claim 1, wherein said oxide is titania or zirconia.

4. A catalyst comprising a catalyst support according to claim 1, and a catalytic metal having hydrogenation activity and supported on said catalyst support.

5. A catalyst as claimed in claim 4, wherein said catalytic metal is present in an amount of 0.1–10% by weight, in terms of elemental metal, based on the weight of the catalyst carrier.

6. A method of preparing a catalyst support according to claim 1, comprising the steps of:

(a) contacting a zeolite with a solution having a pH of 0.8–2 and containing a salt of a metal selected from the group consisting of Ti, Zr and Hf, said zeolite having an Al/Si atomic ratio of 0.01–0.35 and mesopores having a pore diameter in the range of 5–30 nm and accounting for at least 10% by volume of a total pore volume thereof, so that a hydroxide of said metal deposits on inside walls of the mesopores with the simultaneous reduction of the Al/Si atomic ratio;

(b) then washing and drying said metal hydroxide-bearing zeolite; and (c) then calcining said dried zeolite at 400–600° C. to convert the metal hydroxide into metal oxide.

7. A method as claimed in claim 6, wherein said zeolite used in step (a) has an Al/Si atomic ratio of 0.1–0.33.

8. A process for hydrocracking a heavy oil comprising subjecting said heavy oil to hydrocracking conditions in the presence of a catalyst according to claim 4.

9. A process as claimed in claim 8, wherein said heavy oil contains asphaltene.

* * * * *